(12) United States Patent
Toms et al.

(10) Patent No.: US 11,131,261 B2
(45) Date of Patent: Sep. 28, 2021

(54) METHOD AND SYSTEM FOR COMPENSATING ENGINE BLOW-THROUGH AIR

(71) Applicant: Ford Global Technologies, LLC, Dearborn, MI (US)

(72) Inventors: Douglas Owen Toms, Farmington Hills, MI (US); Paul Mahlon Ranspach, Allen Park, MI (US); Stephen William Magner, Farmington Hills, MI (US); Kenneth John Behr, Farmington Hills, MI (US); Zena Yanqing Yee, Beverly Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/683,555

(22) Filed: Nov. 14, 2019

(65) Prior Publication Data

US 2021/0148295 A1    May 20, 2021

(51) Int. Cl.
*F02D 41/14* (2006.01)
*F02D 41/00* (2006.01)
*F02D 41/40* (2006.01)

(52) U.S. Cl.
CPC ..... *F02D 41/1401* (2013.01); *F02D 41/0007* (2013.01); *F02D 41/009* (2013.01); *F02D 41/1454* (2013.01); *F02D 41/40* (2013.01); F02D 2041/141 (2013.01); F02D 2200/0406 (2013.01)

(58) Field of Classification Search
CPC ............. F02D 41/0007; F02D 41/0235; F02D 41/1401; F02D 2041/141; F02D 2041/1419; F02D 41/1454; F02D 41/1455; F02D 41/1456; F02D 41/40; F02D 13/0261; F02D 41/006
See application file for complete search history.

(56) References Cited

U.S. PATENT DOCUMENTS

| | | | |
|---|---|---|---|
| 5,845,624 A * | 12/1998 | Ajima | F02D 41/008 123/494 |
| 6,761,024 B2 | 7/2004 | Uchida | |
| 10,180,109 B2 | 1/2019 | Okubo et al. | |
| 2009/0206184 A1* | 8/2009 | Yan | F02M 47/027 239/584 |
| 2011/0209685 A1* | 9/2011 | Shane | F02D 41/064 123/299 |
| 2012/0316756 A1* | 12/2012 | Tsuyuki | F02D 41/18 701/104 |
| 2013/0144510 A1* | 6/2013 | Iwazaki | F02D 41/1454 701/104 |
| 2015/0184582 A1* | 7/2015 | Kondo | F02D 41/2454 123/674 |

FOREIGN PATENT DOCUMENTS

DE    102009045792 A1    5/2011

* cited by examiner

*Primary Examiner* — Jesse S Bogue
*Assistant Examiner* — Loren C Edwards
(74) *Attorney, Agent, or Firm* — Geoffrey Brumbaugh; McCoy Russell LLP (57) ABSTRACT

A method for adjusting an air-fuel ratio of a turbocharged engine that operates without blow though and with blow through is disclosed. In one example, the method provides a way to provide a feed forward fuel adjustment in the presence of engine blow though so that a closed loop controller does not have to exceed its range of control authority.

16 Claims, 4 Drawing Sheets

METHOD AND SYSTEM FOR COMPENSATING ENGINE BLOW-THROUGH AIR

BACKGROUND/SUMMARY

An engine may include a turbocharger for improving engine output. The engine may also include variable cam timing to improve engine output and engine emissions. During some conditions, the variable cam timing may be adjusted such that intake valve opening time and exhaust valve opening time overlap. The overlap may be useful to clear exhaust residuals from the cylinder and to reduce an amount of time for the turbocharger compressor to reach a desired or requested speed. In particular, the intake and exhaust valve overlap may allow fresh air to blow through the cylinder without having participated in combustion of air and fuel within the cylinder. The fresh air may impart a force to the turbocharger turbine such that the turbocharger turbine speed increases, thereby increasing compressor speed. By reducing the amount of time it takes for the compressor to reach a speed at which the compressor has capacity to deliver a desired air flow, turbocharger lag may be reduced. However, since the air that flows through the cylinder has not participated in combustion, it may influence an output of an oxygen sensor that is located in the engine's exhaust system upstream of the catalyst. Additionally, the remaining cylinder air charge may have been over-fueled, resulting in excess carbon monoxide (CO). Therefore, the exhaust gas has both excess oxygen (O2) and CO instead of a preponderance of one or the other at given time. In particular, the exhaust gas oxygen sensor may not be as accurate in determining the overall air-fuel ratio since the presence of both O2 and CO appears as incomplete combustion. Once the exhaust gas is acted upon by the catalyst, which completes most of the remaining possible reactions, the mid-bed catalyst located O2 sensor can assess the actual air-fuel ratio, and the control system can correct fueling for the blow through condition. The mid-bed O2 sensor feedback, however, takes time to recognize the blow through induced air-fuel ratio shift. In addition, if the oxygen concentration in the exhaust exceeds a threshold level, the closed loop engine fuel control system may have insufficient control authority to compensate for the blow through air. For at least these reasons, the nominal air-fuel ratio in the exhaust system may deviate from stoichiometry and cause an increase in tailpipe emissions. Therefore, it may be desirable to provide a way of compensating for the effects of engine blow through.

The inventors herein have recognized the above-mentioned disadvantages and have developed a method for operating an engine, comprising: adjusting a fuel injection amount via applying a feed forward fuel correction in response to an indication of engine blow through.

Excess air entering an exhaust system as a result of engine blow through may be compensated via applying a feed forward fuel correction so that a limit of a control range of authority may not be exceeded and so that an engine air-fuel ratio may be maintained near a stoichiometric value. In addition, if an air-fuel ratio error exceeds a threshold value during engine blow through, a specialized feedback fuel correction may be permitted. Consequently, a catalyst may be maintained in a state of high efficiency even during conditions of engine blow through.

The present description may provide several advantages. In particular, the approach may reduce engine exhaust emissions during engine blow through. Further, the approach may allow a controller to remain within its range of control authority while providing a desired or requested engine air-fuel ratio. Further still, the approach may provide accurate exhaust air-fuel ratio control even during conditions when an exhaust gas sensor transfer function may be inaccurate.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
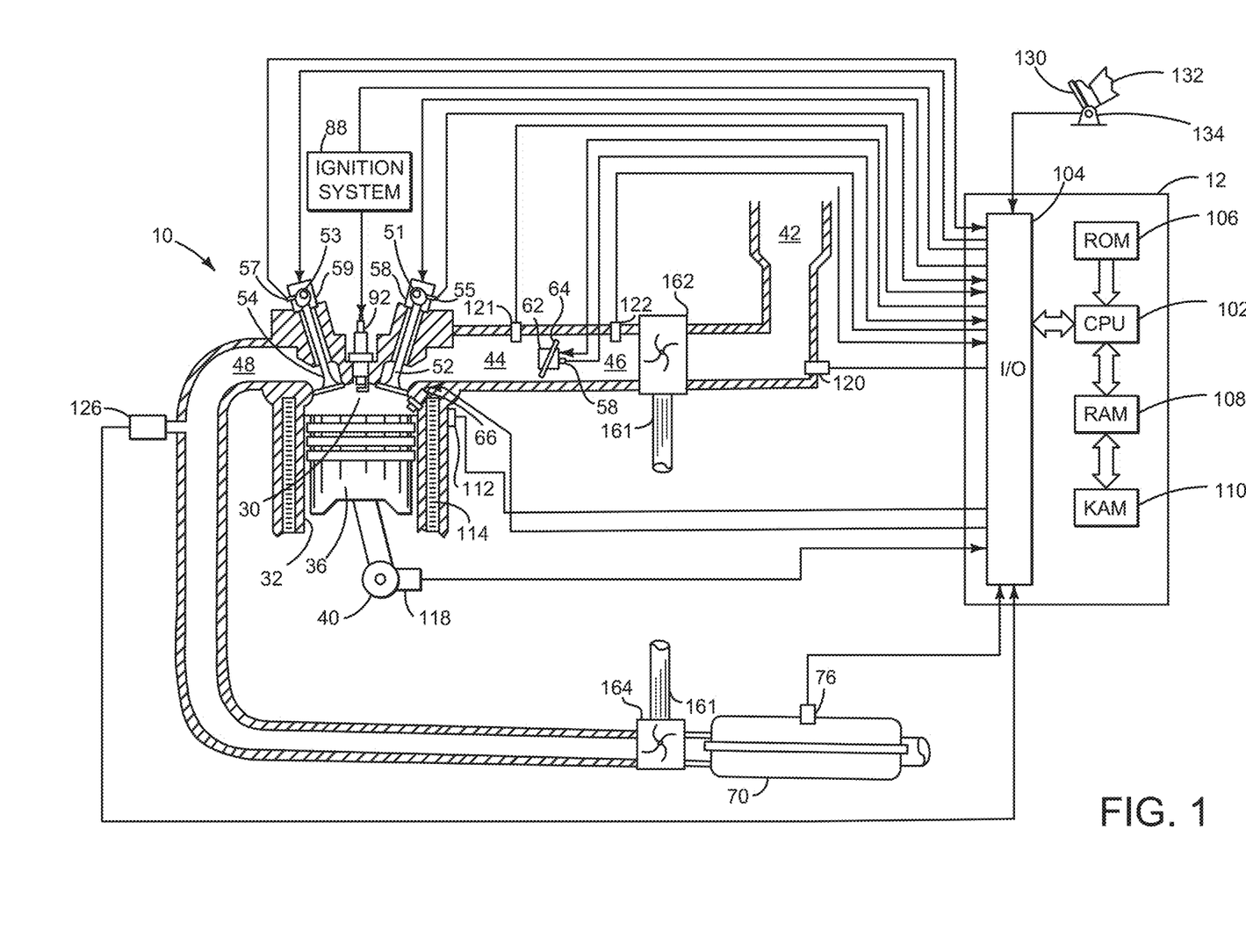
FIG. 1 shows a schematic depiction of an engine.
Figure 2:
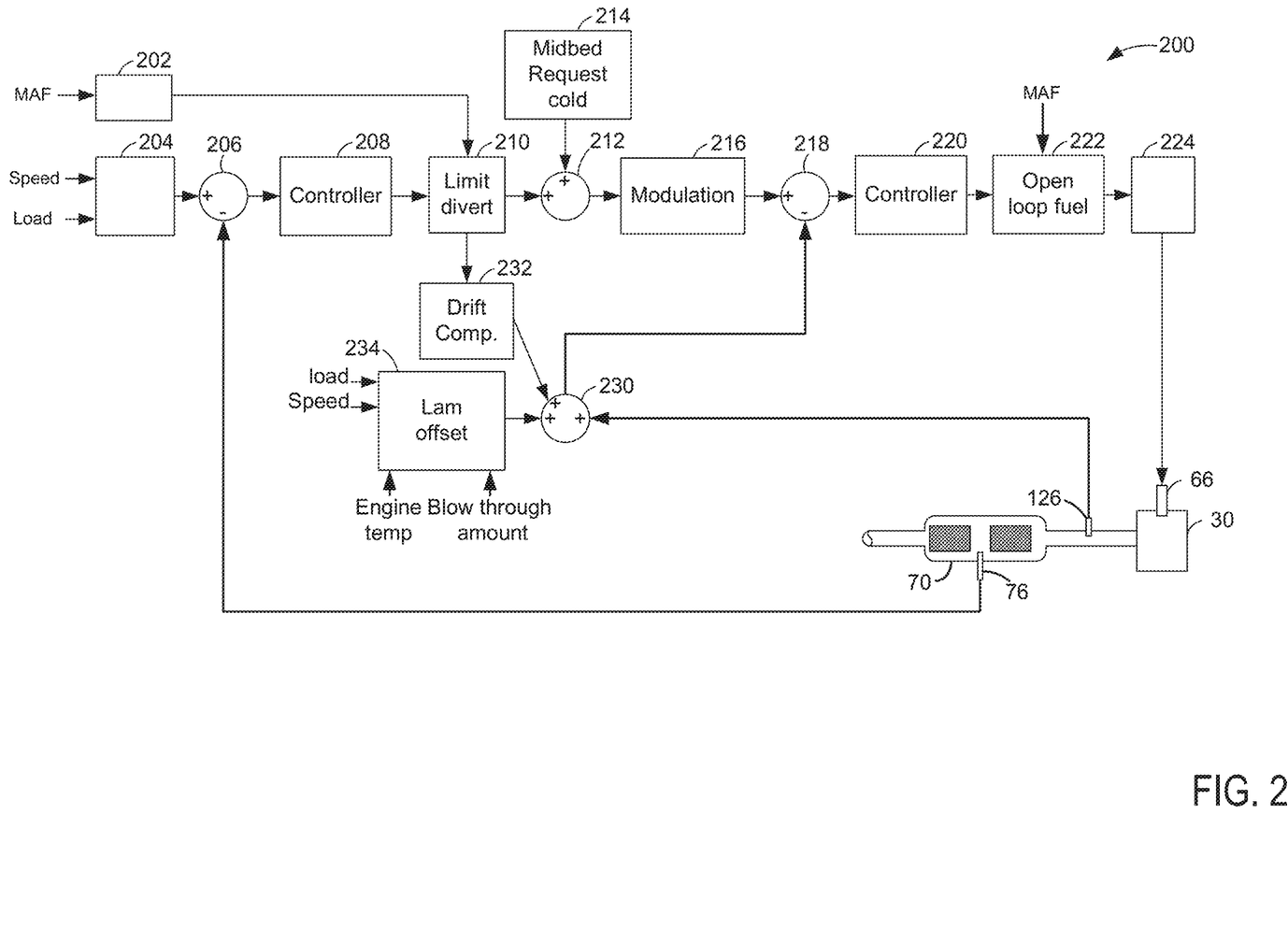
FIG. 2 shows a block diagram of an engine fuel control system.
Figure 3:
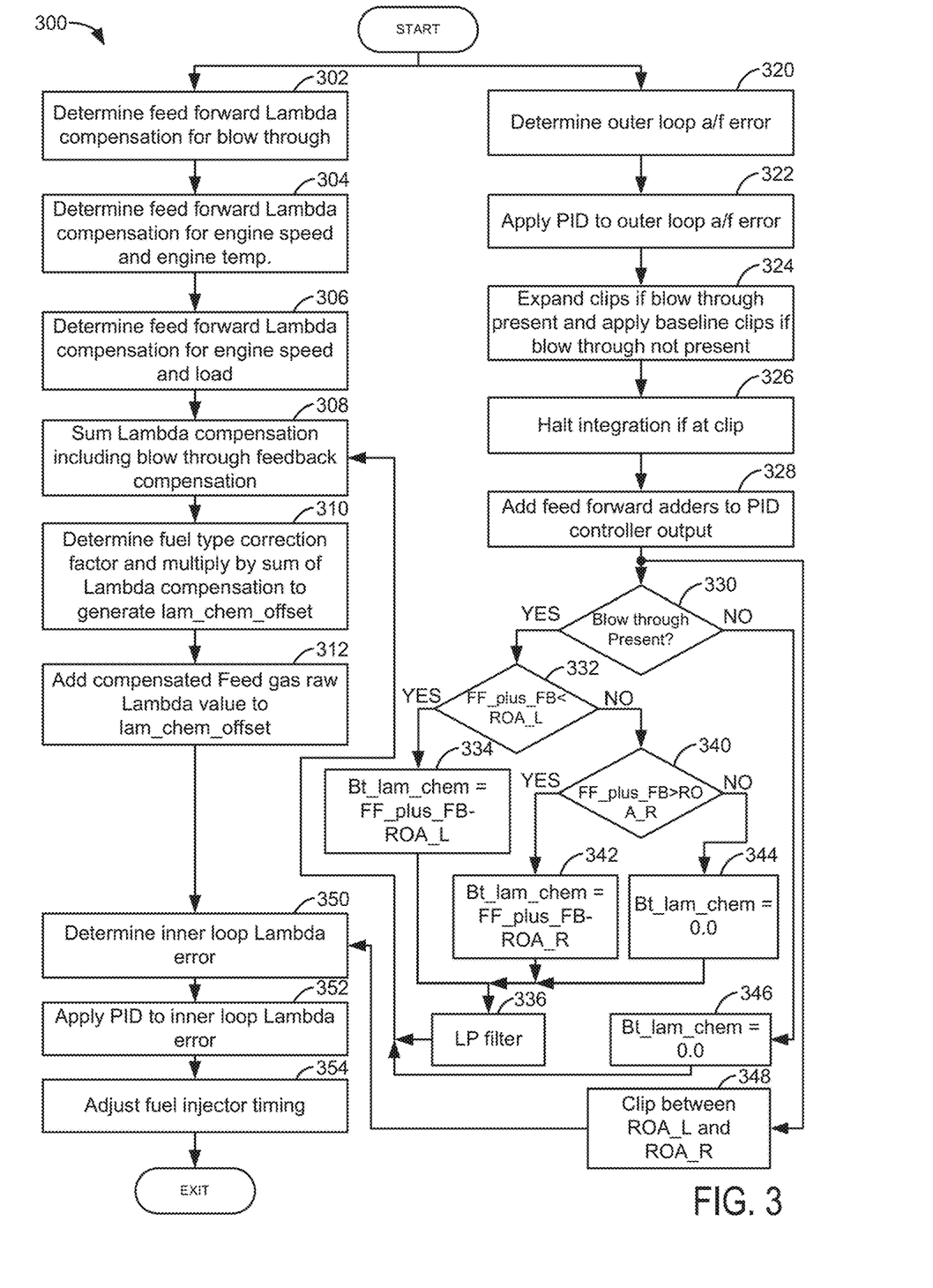
FIG. 3 shows a high level flowchart of a method for controlling engine fuel flow.
Figure 4:
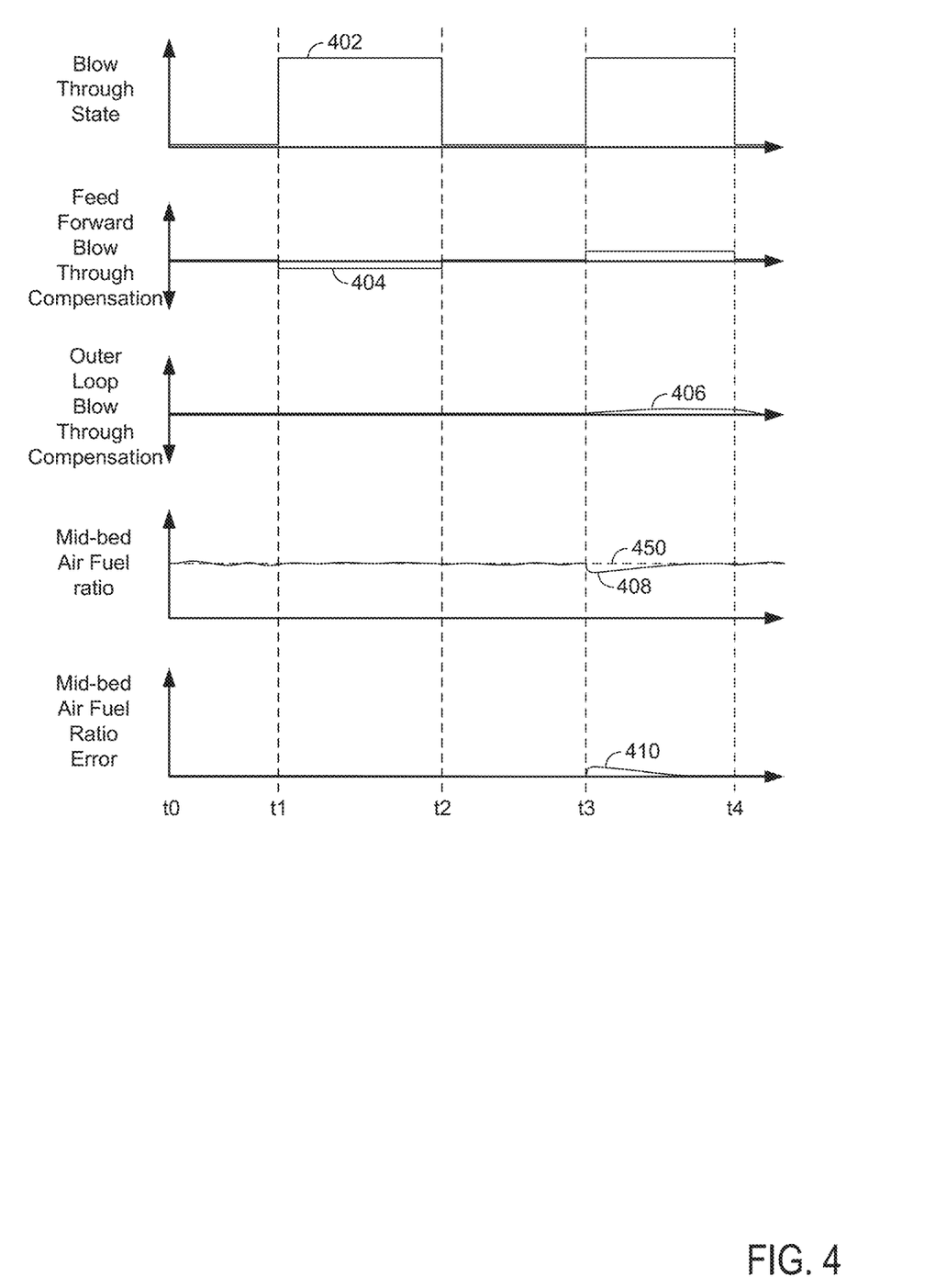
FIG. 4 shows an example engine operating sequence according to the block diagram of FIG. 2 and the method of FIG. 3.

The present description is directed to compensating for air that passes through an engine intake manifold, into a cylinder, and into an exhaust system without having participated in combustion within the engine, which may alternatively be referred to as engine blow through or engine air blow through. Engine blow through may help to enhance engine performance via reducing turbocharger lag; however, it may also lead to degraded engine exhaust emissions. The possibility of higher engine exhaust emissions may be reduced or prevented by applying a feed forward correction only when engine blow through is determined or indicated. If the feed forward does not completely compensate for the engine blow through, then feedback via a catalyst monitor sensor (CMS) may be applied to further improve air-fuel control. FIG. 1 shows one example system that includes compensation for engine blow through. A block diagram of an engine fuel controller that compensates for engine blow through is shown in FIG. 2. A method for compensating engine blow through is shown in FIG. 3. Finally, an example engine operating sequence in which engine blow through compensation is provided is shown in FIG. 4.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. A position of intake cam may be adjusted relative to a position of crankshaft 40 via variable intake cam actuator 58. A position of exhaust cam may be adjusted relative to a position of crankshaft 40 via variable exhaust cam actuator 59. Alternatively, one or more of the intake and exhaust valves may be operated by an electromechanically controlled valve coil and armature assembly. The position of intake cam 51 may be determined by intake cam sensor 55. The position of exhaust cam 53 may be determined by exhaust cam sensor 57.

Fuel injector 66 is shown positioned to inject fuel directly into cylinder 30, which is known to those skilled in the art as direct injection. Alternatively, fuel may be injected to an intake port, which is known to those skilled in the art as port injection. Fuel injector 66 delivers liquid fuel in proportion to the pulse width of signal from controller 12. Fuel is delivered to fuel injector 66 by a fuel system (not shown) including a fuel tank, fuel pump, and fuel rail (not shown). Fuel injector 66 is supplied operating current from driver 68 which responds to controller 12. In addition, intake manifold 44 is shown communicating with optional electronic throttle 62 which adjusts a position of throttle plate 64 to control air flow from intake boost chamber 46.

Exhaust gases spin turbocharger turbine 164 which is coupled to turbocharger compressor 162 via shaft 161. Compressor 162 draws air from air intake 42 to supply boost chamber 46. Thus, air pressure in intake manifold 44 may be elevated to a pressure greater than atmospheric pressure. Consequently, engine 10 may output more power than a normally aspirated engine. In other examples, compressor 162 may be a supercharger driven by the engine where turbine 164 is omitted.

Distributorless ignition system 88 provides an ignition spark to combustion chamber 30 via spark plug 92 in response to controller 12. Ignition system 88 may provide a single or multiple sparks to each cylinder during each cylinder cycle. Further, the timing of spark provided via ignition system 88 may be advanced or retarded relative to crankshaft timing in response to engine operating conditions.

Universal Exhaust Gas Oxygen (UEGO) sensor 126 is shown coupled to exhaust manifold 48 upstream of exhaust gas after treatment device 70. Alternatively, a two-state exhaust gas oxygen sensor may be substituted for UEGO sensor 126. In some examples, exhaust gas after treatment device 70 is a particulate filter and/or a three-way catalyst. In other examples, exhaust gas after treatment device 70 is solely a three-way catalyst. A heated exhaust gas oxygen sensor (HEGO) 76 is positioned between two catalyst bricks. It senses the air-fuel ratio at a mid-bed location of exhaust gas after treatment device 70.

Controller 12 is shown in FIG. 1 as a conventional microcomputer including: microprocessor unit 102, input/output ports 104, read-only memory (non-transitory memory) 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing accelerator position adjusted by foot 132; a knock sensor for determining ignition of end gases (not shown); a measurement of engine manifold pressure (MAP) from pressure sensor 121 coupled to intake manifold 44; a measurement of boost pressure from pressure sensor 122 coupled to boost chamber 46; an engine position sensor from a Hall effect sensor 118 sensing crankshaft 40 position; a measurement of air mass entering the engine from sensor 120 (e.g., a hot wire air flow meter); and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

In some embodiments, the engine may be coupled to an electric motor/battery system in a hybrid vehicle. The hybrid vehicle may have a parallel configuration, series configuration, or variation or combinations thereof. Further, in some embodiments, other engine configurations may be employed, for example a diesel engine.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is described merely as an example, and that intake and exhaust valve opening and/or closing timings may vary, such as to provide positive or negative valve overlap, late intake valve closing, or various other examples.

Thus, the system of FIG. 1 provides for an engine system, comprising: an engine including one or more fuel injectors; a turbocharger coupled to the engine; an exhaust system coupled to the turbocharger; an exhaust gas after treatment device positioned along the length of the exhaust system; and a controller including instructions executable instructions stored in non-transitory memory that cause the controller to adjust a fuel injection amount of the one or more fuel injectors via applying a feed forward fuel correction only when engine blow through air is indicated. The engine system includes where the feed forward fuel correction is a function of engine cam timing. The engine system includes where the feed forward fuel correction is a function of an engine air flow amount. The engine system further comprises additional executable instructions that cause the controller to apply a feedback fuel correction only when the engine blow through air is indicated and when a threshold air-fuel ratio error is exceeded. The engine system further comprises additional executable instructions that cause the controller to add the feedback fuel correction to the feed forward fuel correction. The engine system further comprises additional instructions to subtract the feedback fuel correction and the feed forward fuel correction from modified requested mid-bed catalyst air-fuel ratio or voltage. The engine system includes where the modified requested mid-bed catalyst air-fuel ratio or voltage is purposefully modulated.

Referring now to FIG. 2, a block diagram of an engine fuel controller is shown. The controller in block diagram 200 may be implemented in controller 12 as part of the system in FIG. 1 and as executable instructions stored in non-transitory memory. The controller in block diagram 200 may adjust states of actuators in the physical world via controller 12 to adjust engine operation.

At table or function 202, engine air mass flow rate (MAF), intake and exhaust cam timing, and exhaust gas recirculation amount (EGR) are applied to reference a table or function 202 that outputs an indication of whether or not engine blow through is present. For example, the table or function 202 may output a value of one or true if engine blow through is expected to be present. The table or function 202 may output a value of zero or false if engine blow is not expected to be present. Alternatively, the presence or absence of engine blow through may be determined as described in U.S. Pat. No. 9,399,962, which is fully incorporated by reference for all intents and purposes. The output of table or function 202 is directly input to 210.

At table or function 204, engine speed (N) and engine load are applied to reference table or function 204. Table or function 204 outputs a requested or desired mid-bed air-fuel ratio, or alternatively, a CMS voltage request. The CMS voltage request may be converted to an air-fuel ratio, if desired. The mid-bed air-fuel ratio is a requested or desired air-fuel ratio at the location of the CMS sensor in the exhaust system. The requested or desired mid-bed air-fuel ratio may be empirically determined via operating a vehicle on a chassis dynamometer and adjusting the requested air-fuel ratio according to engine speed and engine load. The requested mid-bed air-fuel ratio is input to summing junction 206 where the output of the CMS sensor is subtracted from the desired or requested mid-bed air-fuel ratio, or alternatively, the desired or requested CMS voltage to generate a mid-bed air-fuel ratio error, or a mid-bed CMS voltage error.

The mid-bed air-fuel ratio error or the CMS voltage error is output from summing junction 206 and input to a proportional/integral/derivate (PID) controller at 208. The PID controller outputs a mid-bed air-fuel correction, or alternatively, a mid-bed CMS correction value to 210. At 210, the mid-bed air-fuel ratio, or alternatively, the mid-bed CMS voltage may be limited or constrained between an upper threshold value and a lower threshold value. Further, only when engine blow through is expected, output of PID controller that is greater that the upper threshold limit (e.g. a level that is not to be exceeded by the output of the PID controller) or less than the lower threshold limit (e.g., a level that bounds negative output values of the PID controller), may be directed to 232. Output of PID controller 208 that is less than the upper threshold limit or that is constrained to or limited to being equal to the upper threshold limit is directed to summing junction 212. Further, output of PID controller 208 that is greater than the lower threshold limit or that is constrained to or limited to being equal to the lower threshold limit is directed to summing junction 212. Table or function 214 outputs a requested or desired air-fuel ratio, or alternatively, a requested or desired CMS voltage that is a function of exhaust temperature to summing junction 212. The output of 210 is added to the output of 214 at summing junction 212. The output of summing junction 212 is directed to modulation block 216.

At modulation block 216, the output of summing junction 212 is modulated via a square wave, sine wave, triangle wave, or random function. In one example, modulation block also converts the desired air-fuel ratio to a desired Lambda, where Lambda is given via the following equation:

Lambda=exhaust air-fuel ratio/Stoichiometric air-fuel ratio where the exhaust air-fuel ratio is the present exhaust air-fuel ratio inferred from the present exhaust gases, and the stoichiometric air-fuel ratio is the stoichiometric air-fuel ratio of the fuel being combusted in the engine. The requested or desired Lambda is then an average of value of the modulated output. The Lambda amplitude and frequency of modulation may be adjusted as a function of engine air mass flow rate and catalyst temperature. The output of modulator 216 is directed to and input to summing junction 218.

The present engine feed gas output is measured via UEGO sensor 126 and the measured value is converted into a Lambda value that is input to summing junction 230 where it is added with the output of 232 and the output of 234. A Lambda offset value is determined at 234 and it may be a function of engine load, engine speed, engine temperature, and engine blow through amount. The engine blow through amount may be estimated via a table or function that holds engine blow through amounts that are a function of engine cam timing, engine EGR amount, and engine mass air flow rate. The Lambda offset value or amount is input to summing junction 230 where it is added to the Lambda value measured via the UEGO sensor 126. The output of 232 compensates for UEGO Lambda drift via providing an offset value to the PID output from 210 that is above the upper air-fuel ratio threshold or the PID output from 210 that is less than the lower air-fuel ratio threshold. The output of 232 is zero if engine blow through is not present and it may be non-zero only when engine blow through is present. In addition, the PID air-fuel ratio correction may be converted to a Lambda correction before it is input to summing junction 230. The output of summing junction 230 is input to summing junction 218.

At summing junction 218, the output of summing junction 230 is subtracted from the output of modulator 216. The output of summing junction 218 is then input to a second PID controller at 220. The output of the second PID controller is input to block 222 where it is added to an open loop Lambda request. The open loop Lambda request may be a function of the present engine speed and engine load. The open loop Lambda plus the Lambda value that is output from the second PID controller are added together at 222 and converted a fuel injection amount. The fuel injection amount is converted into a fuel injector opening time that is output from driver circuit 224 to fuel injector 66. Fuel injector 66 injects fuel to cylinder 30 where the fuel is combusted with air.

Thus, the engine blow through amount may be input to the fuel controller to generate an open loop Lambda value that is converted into a fuel injector adjustment amount. Further, CMS sensor output may be applied to generate a feedback Lambda adjustment that may be influenced via the actual engine blow through.

Referring now to FIG. 3, a high level flowchart of a method for compensating for engine blow through is shown. The method of FIG. 3 may be incorporated as executable instructions in cooperation with the system of FIG. 1.

Method 300 may adjust states of actuators in the physical world in cooperation with controller 12 in the system of FIG. 1 to adjust engine operation.

At 302, method 300 determines a feed forward Lambda offset adjustment or compensation value that is a function of engine air mass, engine EGR amount, and engine cam timing. In one example, method 300 may reference a table or function of empirically determined values and the table or function outputs a Lambda offset value. The values in the table or function may be determined via operating an engine on a dynamometer and adjusting Lambda offset values according to an estimated engine blow through amount. Method 300 proceeds to 304 after the Lambda offset value according to the estimated engine blow through is determined.

At 304, method 300 determines a feed forward Lambda adjustment or compensation amount that is a function of engine speed and engine temperature. In one example, the feed forward Lambda adjustment may be determined via output of a table or function that is referenced via engine speed and engine temperature. Values in the table may be empirically determined via operating the engine on a dynamometer and adjusting Lambda values in the table or function as a function of engine speed and engine temperature. Method 300 proceeds to 306 after determining the Lambda adjustment for engine speed and engine temperature.

At 306, method 300 determines a feed forward Lambda adjustment or compensation amount that is a function of engine speed and engine load. In one example, the feed forward Lambda adjustment may be determined via output of a table or function that is referenced via engine speed and engine load. Values in the table may be empirically determined via operating the engine on a dynamometer and adjusting Lambda values in the table or function as a function of engine speed and engine load. Method 300 proceeds to 308 after determining the Lambda adjustment for engine speed and engine load.

At 308, method 300 sums the Lambda compensation values for engine blow through as determined at 302, the Lambda compensation for engine speed and engine temperature as determined at 304, and the Lambda compensation for engine speed and engine load as determined at 308. In addition, method 300 adds an engine blow through feedback adjustment or amount to the Lambda compensation values for engine blow through as determined at 302, the Lambda compensation for engine speed and engine temperature as determined at 304, and the Lambda compensation for engine speed and engine load as determined at 308. Method 300 proceeds to 310.

At 310, method 300 determines a fuel factor Lambda adjustment value. In one example, the fuel factor Lambda adjustment value may be a function of a percent of alcohol fuel in the fuel that is being combusted by the engine. The percentage of alcohol fuel may be applied to reference a table that outputs an empirically determined Lambda amount according to the percentage of alcohol that is being combusted in the engine. Method 300 adds the fuel factor Lambda adjustment value to the summed Lambda value determined at 308 to determine a chemical offset. Method 300 proceeds to 312.

At 312, method 300 adds a Lambda drift compensation Lambda amount to a measured Lambda feed gas (e.g., engine output Lambda measurement) value and the chemical offset Lambda value is added to the sum of the Lambda drift compensation and the measured Lambda feed gas to generate a corrected Lambda measurement. Method 300 proceeds to 350.

At 320, method 300 generates an outer loop air-fuel ratio error via subtracting output of a CMS sensor from a desired after treatment mid-bed air-fuel ratio. The desired mid-bed air-fuel ratio may be a function of engine speed and engine load. In particular, method 300 may look-up a requested or desired after treatment mid-bed air-fuel ratio via referencing a table or function of empirically determined air-fuel ratio values according to the present engine speed and engine load. The table or function outputs the requested or desired mid-bed air-fuel ratio. The air-fuel measured via the CMS sensor at the mid-bed is subtracted from the requested or desired after treatment mid-bed air-fuel ratio to generate the outer loop air-fuel ratio error. In other examples, a CMS voltage may be substituted for the mid-bed air-fuel ratio. Method 300 proceeds to 322.

At 322, method 300 inputs the output loop air-fuel error into an outer loop PID controller. The outer loop PID controller outputs a control adjustment to the commanded Lambda value for the engine. In one example, the outer loop PID controller and the other PID controllers mentioned herein may be expressed as:

$$u(t)=K_p*e(t)+K_i*\text{int}(e(t))*dt+K_d*(de(t)/dt)$$

where u(t) is the output of the outer loop PID controller, $K_p$ is the proportional gain, int represents an integral sign, e(t) is the air-fuel error that is input to the outer loop PID controller, $K_i$ is the integral gain, and $K_d$ is the derivative gain. Method 300 proceeds to 324.

At 324, method 300 expands the control authority of output of the outer loop PID controller at 322 if engine blow through is expected or determined. For example, the outer loop PID controller may be permitted to adjust the Lambda value between values of 0.99 and 1.01 if engine blow through is not expected or determined and the output of the outer loop PID controller may be permitted to adjust the Lambda value between values of 0.98 and 1.02 if engine blow through is detected. Method 300 proceeds to 326.

At 326, method 300 halts integration in the outer loop PID controller at 322 if output of the outer loop PID controller exceeds an upper threshold (e.g., >1.01 or is <a lower threshold 0.99. By halting integration, the integration value is kept from exceeding large values, thereby maintaining the effectiveness of the integral term during changes in direction of the air-fuel ratio value. Method 300 proceeds to 328.

At 328, method 300 adds feed forward amounts to the output of the outer loop PID controller. In one example, feed forward amounts may include but are not limited to feed forward values or amounts for air-fuel or Lambda values when engine exhaust temperature is less than a threshold temperature. The feed forward values may be empirically determined and they may be stored in a function or table that is referenced via engine exhaust system temperature. The output of 328 is outer loop feedback plus outer loop feed forward. Method 300 proceeds to 330 and 348.

At 348, method 300 limits the outer loop feed forward plus outer loop feedback to values between ROA_L (e.g., range of authority lean—a lower air-fuel threshold which mid-bed air-fuel ratio may not be commanded lower than) and ROA_R (e.g., range of authority rich—a upper air-fuel threshold which mid-bed air-fuel ratio may not be commanded greater than). Method 300 outputs the range limited outer loop PID output to 350.

At 330, method 300 may judge whether or not engine blow through is determined or expected. In one example, engine blow through may be determined or expected as a function of engine cam timing, engine mass air flow, and engine EGR amount. The engine cam timing, engine mass air flow, and engine EGR amount may reference a table or function that outputs a value of one if engine blow through is expected or determined. The table or function may output a value of zero if engine blow through is not expected or not determined. Values in the table may be empirically determined via operating an engine on a dynamometer while adjusting engine cam timing, engine speed, EGR, and engine load. If method 300 judges that engine blow through is present, the answer is yes and method 300 proceeds to 332. Otherwise, the answer is no and method 300 proceeds to 346.

At 346, method 300 adjusts the value of the engine blow through Lambda chemical offset to zero. The output of 346 is input to 308.

At 332, method 300 judges if the outer loop feed forward plus feedback value is less than the ROA_L. If so, the answer is yes and method 300 proceeds to 334. Otherwise, the answer is no and method 300 proceeds to 340.

At 334, method 300 adjusts the Lambda chemical offset value to equal the outer loop feed forward adjustment plus the outer loop feedback adjustment minus the ROA_L value. Method 300 outputs the Lambda chemical offset value to 336.

At 340, method 300 judges if the outer loop feed forward plus feedback value is greater than the ROA_R. If so, the answer is yes and method 300 proceeds to 342. Otherwise, the answer is no and method 300 proceeds to 344.

At 342, method 300 adjusts the Lambda chemical offset value to equal the outer loop feed forward adjustment plus the outer loop feedback adjustment minus the ROA_R value. Method 300 outputs the Lambda chemical offset value to 336.

At 344, method 300 adjusts the Lambda chemical offset value to zero. Method 300 outputs the Lambda chemical offset value to 336.

At 336, method 300 filters the Lambda chemical offset value via a first order low pass filter. Method 300 outputs the low pass filtered Lambda chemical offset value to 308.

At 350, method 300 determines an inner loop Lambda error. In one example, the inner loop Lambda error may be determined via subtracting the output of 312 from the output of 348. Method 300 proceeds to 352.

At 352, method 300 applies a second PID controller to the output of 350. The output of 352 is an inner loop Lambda correction value. Method 300 proceeds to 354.

At 354, method 300 determines a feed forward fuel injection amount according to a requested or desired engine Lambda and the present engine air mass flow. The requested or desired Lambda is then adjusted via adding the inner loop Lambda correction to the requested or desired Lambda. The adjusted Lambda value is then commanded via adjusting opening timing of fuel injectors. Method 300 proceeds to exit.

In this way, an inner loop Lambda command may be adjusted responsive to a feed forward Lambda chemical offset value that is a function of engine blow through. Further, the inner loop Lambda command may be adjusted responsive to a feedback engine blow through amount.

Thus, the method of FIGS. 2 and 3 provides for a method for operating an engine, comprising: adjusting a fuel injection amount via applying a feed forward fuel correction in response to an indication of engine blow through. The method includes where the feed forward fuel correction is added to feedback supplied via an oxygen sensor. The method includes where the feed forward fuel correction is a function of an engine air flow amount. The method includes where the feed forward fuel correction is a function of engine cam timing. The method includes where the feed forward fuel correction is a function of an exhaust gas recirculation amount. The method includes where the feed forward fuel correction is applied to an inner control loop of a fuel control system. The method includes where the fuel control system also includes an outer control loop that provides input to the inner control loop.

The method of FIGS. 2 and 3 also provides for a method for operating an engine, comprising: adjusting a fuel injection amount via applying a feedback fuel correction only in response to engine blow through being indicated and a threshold air-fuel ratio error being exceeded. The method includes where the feedback fuel correction is added to output of an oxygen sensor. The method further comprises only adjusting the fuel injection amount via applying a feed forward fuel correction in response to an indication of engine blow through. The method includes where the indication of engine blow through is a function of engine air mass flow. The method further comprises not adjusting the fuel injection amount in response to an absence of engine blow through being indicated and adjusting the feedback fuel correction to a value of zero. The method further comprises not adjusting the fuel injection amount in response to an absence of engine blow through being indicated and adjusting the feed forward fuel correction to a value of zero.

Referring now to FIG. 4, an example engine operating sequence according to the method of FIGS. 3 and 4 is shown. The sequence of FIG. 4 may be provided via the system of FIG. 1. The vertical lines at times t0-t4 represent times of interest during the sequence.

The first plot from the top of FIG. 4 is a plot of engine blow through state versus time. The vertical axis represents the engine blow through state and engine blow through is determined or expected when trace 402 is at a higher level near the vertical axis arrow. Engine blow through is not expected when trace 402 is at the level near the horizontal axis. The horizontal axis represents time and time increases from the left side of the figure to the right side of the figure. Trace 402 represents the engine blow through state.

The second plot from the top of FIG. 4 is a plot of a feed forward engine blow through correction or compensation amount versus time. The feed forward engine blow through correction is a positive value when trace 404 is above the horizontal axis. The feed forward engine blow through correction is a negative value when trace 404 is below the horizontal axis. The horizontal axis represents time and time increases from the left side of the figure to the right side of the figure. Trace 404 represents the feed forward engine blow through compensation.

The third plot from the top of FIG. 4 is a plot of outer loop blow through correction or compensation amount versus time. The outer loop blow through correction or compensation amount is a positive value when trace 406 is above the horizontal axis. The outer loop blow through correction or compensation is a negative value when trace 406 is below the horizontal axis. The horizontal axis represents time and time increases from the left side of the figure to the right side of the figure. Trace 406 represents the outer loop blow through correction or compensation.

The fourth plot from the top of FIG. 4 is a plot of after treatment mid-bed air-fuel ratio versus time. The vertical axis represents the after treatment mid-bed air-fuel ratio and the after treatment mid-bed air-fuel ratio increases (e.g., is leaner) in the direction of the vertical axis arrow. The after treatment mid-bed air-fuel ratio is richer near the horizontal axis. Line 450 represents a stoichiometric air-fuel ratio. The horizontal axis represents time and time increases from the left side of the figure to the right side of the figure. Trace 408 represents the after treatment mid-bed air-fuel ratio as measured via the HEGO sensor.

The fifth plot from the top of FIG. 4 is a plot of after treatment mid-bed air-fuel ratio error versus time. The vertical axis represents the after treatment mid-bed air-fuel ratio error and the after treatment mid-bed air-fuel ratio error increases (e.g., is leaner) in the direction of the vertical axis arrow. The after treatment mid-bed air-fuel ratio error is richer near the horizontal axis. The horizontal axis represents time and time increases from the left side of the figure to the right side of the figure. Trace 410 represents the after treatment mid-bed air-fuel ratio error.

At time t0, the engine is operating (not shown) and it is combusting air and fuel. Engine blow through is not indicated or expected and the feed forward blow through compensation amount is zero. The outer loop blow through compensation is zero and the after treatment mid-bed air-fuel ratio is a stoichiometric value. The after treatment mid-bed error is also zero.

At time t1, engine blow through is indicated and a negative amount of engine blow through compensation is provided. The negative amount of engine blow through is accurate so that the after treatment mid-bed air-fuel ratio does not deviate from the requested stoichiometric value so the after treatment mid-bed air-fuel ratio error is zero.

At time t2, engine blow through ends and the feed forward blow through compensation is reduced to zero. The outer loop feedback blow through compensation remains zero and the after treatment mid-bed air-fuel ratio remains stoichiometric. The after treatment mid-bed air-fuel ratio error remains zero.

At time t3, engine blow through is indicated again and a positive amount of engine blow through compensation is provided. The positive amount of engine blow through is not as accurate as the feed forward engine blow through compensation that was provided at time t1 so that the after treatment mid-bed air-fuel ratio error increases in a positive direction as the after treatment device mid-bed air-fuel ratio moves richer. The outer loop blow through compensation is adjusted to a positive value shortly after time t3.

Between time t3 and time t4, the after treatment mid-bed air-fuel ratio moves richer and then it moves back toward stoichiometry as the outer loop blow through compensation is increased. The after treatment air-fuel ratio error initially increases and then it decreases to zero as the outer loop blow through compensation increases. The after treatment air-fuel ratio initially goes rich and then it returns to stoichiometry as the outer loop blow through compensation increases.

At time t4, engine blow through ends and the feed forward blow through compensation is reduced to zero. The outer loop feedback blow through compensation is also adjusted to zero and the after treatment mid-bed air-fuel ratio remains stoichiometric. The after treatment mid-bed air-fuel ratio error remains zero.

In this way, compensation for engine blow through may be provided via feed forward and feedback. The feed forward compensation may be based off a blow through estimate that may be unaffected by UEGO sensor output error that may increase during engine blow through. However, if the outer loop error is large when feed forward is provided, feedback may also be provided.

As will be appreciated by one of ordinary skill in the art, the method described in FIGS. 2 and 3 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used.

This concludes the description. The reading of it by those skilled in the art would bring to mind many alterations and modifications without departing from the spirit and the scope of the description. For example, single cylinder, I2, I3, I4, I5, V6, V8, V10, V12 and V16 engines operating in natural gas, gasoline, diesel, or alternative fuel configurations could use the present description to advantage.

The invention claimed is:

1. A method for operating an engine, comprising:
adjusting a fuel injection amount via applying a feedback fuel correction and a feed forward fuel correction only in response to an indication of engine blow through and a threshold air-fuel ratio error being exceeded; and
not adjusting the fuel injection amount via not applying the feed forward fuel correction in response to an absence of engine blow through being indicated.

2. The method of claim 1, where the feed forward fuel correction is added to feedback supplied via an oxygen sensor.

3. The method of claim 1, where the feed forward fuel correction is a function of an engine air flow amount.

4. The method of claim 1, where the feed forward fuel correction is a function of engine cam timing.

5. The method of claim 1, where the feed forward fuel correction is a function of an exhaust gas recirculation amount.

6. The method of claim 1, where the feed forward fuel correction is applied to an inner control loop of a fuel control system.

7. The method of claim 6, where the fuel control system also includes an outer control loop that provides input to the inner control loop.

8. An engine system, comprising:
an engine including one or more fuel injectors;
a turbocharger coupled to the engine;
an exhaust system coupled to the turbocharger;
an exhaust gas after treatment device positioned along a length of the exhaust system; and
a controller including executable instructions stored in non-transitory memory that cause the controller to adjust a fuel injection amount of the one or more fuel injectors via applying a feed forward fuel correction only when an engine blow through air is indicated; and to apply a feedback fuel correction only when the engine blow through air is indicated and when a threshold air-fuel ratio is exceeded, wherein the feedback fuel correction is added to the feed forward fuel correction.

9. The engine system of claim 8, where the feed forward fuel correction is a function of engine cam timing.

10. The engine system of claim 8, where the feed forward fuel correction is a function of an engine air flow amount.

11. The engine system of claim 8, further comprising additional instructions to subtract the feedback fuel correction and the feed forward fuel correction from modified requested mid-bed catalyst air-fuel ratio or voltage.

12. The engine system of claim 11, where the modified requested mid-bed catalyst air-fuel ratio or voltage is purposefully modulated.

13. A method for operating an engine, comprising:
adjusting a fuel injection amount via applying a feedback fuel correction and a feed forward fuel correction only in response to engine blow through being indicated and a threshold air-fuel ratio error being exceeded; and
not adjusting the fuel injection amount in response to an absence of engine blow through being indicated and adjusting the feedback fuel correction to a value of zero.

14. The method of claim 13, where the feedback fuel correction is added to output of an oxygen sensor.

15. The method of claim 13, where the indication of engine blow through is a function of engine air mass flow.

16. The method of claim 13, further comprising not adjusting the fuel injection amount in response to an absence of engine blow through being indicated and adjusting the feed forward fuel correction to a value of zero.

\* \* \* \* \*